Patented Aug. 19, 1930

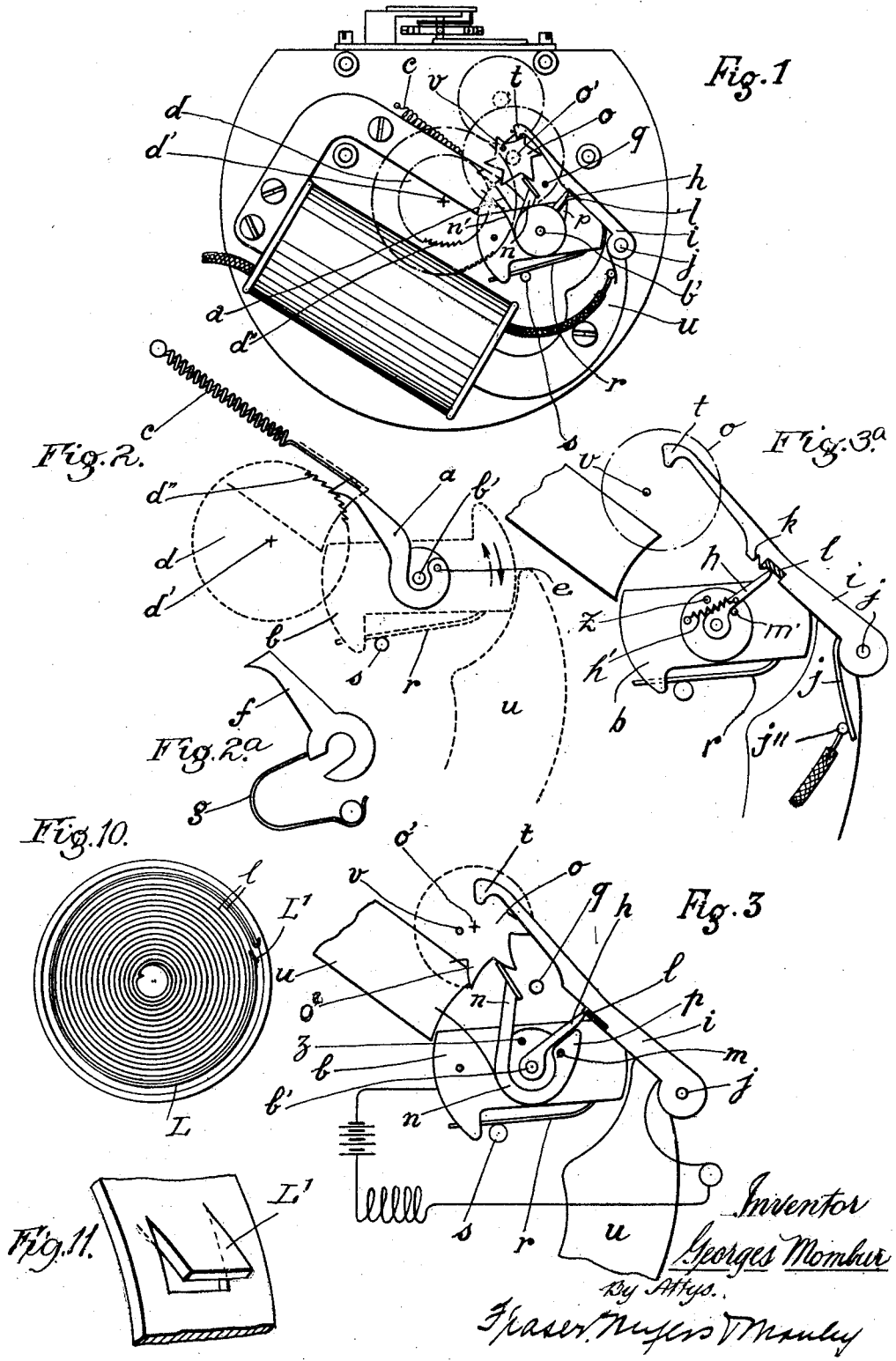

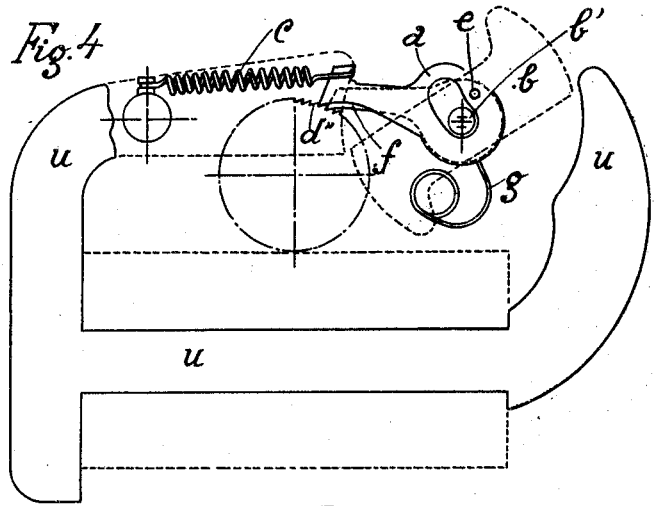
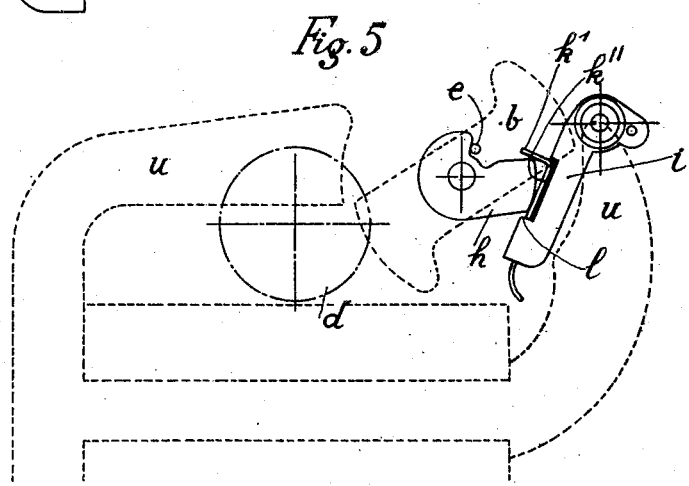
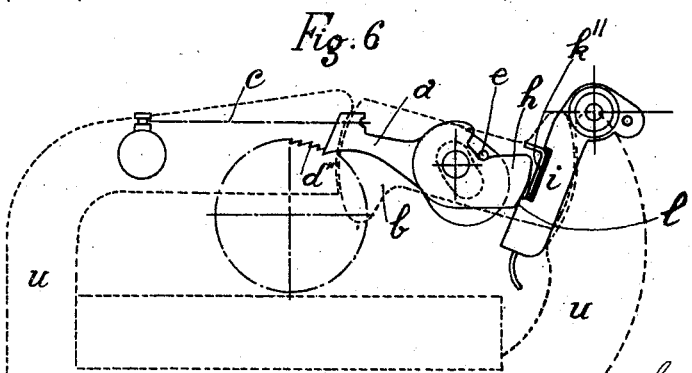

1,773,112

UNITED STATES PATENT OFFICE

GEORGES MOMBUR, OF LA CHAUX-DE-FONDS, SWITZERLAND

ELECTROMECHANICAL SPRING-WINDING DEVICE

Application filed December 19, 1925. Serial No. 76,476, and in France December 29, 1924.

This invention relates to means for imparting an intermittent motion to other devices by the use of the electric current. It is particularly directed to devices which require to be "wound up", or in other words, devices in which some power-storing means is utilized. More especially it is adapted for the winding of clocks or other devices wherein when the power-storing means, such as a spring or the like, has been brought to its maximum capacity, the operation of the winding device will be temporarily stopped to be automatically resumed again when the power-storing device has given up a portion or all of its power.

The ordinary clockwork in which power is stored by a mainspring is a familiar example of one class of such devices.

According to the present invention I provide a means for winding up such mechanism in which the actual power which causes the winding is the reaction of a spring; such spring is put under tension or compression by an electric device, there being means for then releasing the spring so that its stored-up power may wind the mainspring or its equivalent to a small extent and by repeated actions of such actuating spring the mainspring is wound to the desired extent.

In the preferred form of the invention this action continues until the mainspring is under such tension that the power of the actuating spring can no longer wind it any tighter. But when the mainspring has given up some of its power in operating the clockwork, its tension becomes sufficiently relaxed to again enable the actuating spring to wind it. Preferably the electric current is only used during actual winding of the mainspring. The device of my invention has the capacity of operation in all conditions in which the clockwork may be found, that is to say, it will operate whether the clockwork is completely run down or only partially so. In normal operation, however, when a spring is employed as the power-storing means, the latter will be kept in a condition of approximately its maximum or fully-wound condition. Should this be departed from in any case by reason of outside causes, my invention will quickly wind it to a condition of approximate maximum and then intermittently retain it in substantially this condition.

Other features of the invention will be hereinafter more fully described.

Referring to the drawings, which illustrate one form of my invention as applied to a small clock,—

Figure 1 is a front view of the device.

Fig. 2 is a detailed view, partly diagrammatic.

Fig. 2ª is a detached view of the stopping pawl.

Fig. 3 is a detailed view of the switch.

Fig. 3ª is a view of a modification.

Fig. 4 is a plan view of a modification.

Fig. 5 is a similar view, showing the switch in position for starting the oscillation.

Fig. 6 is a view of the same device at the end of the oscillating movement of the armature.

Figure 7:
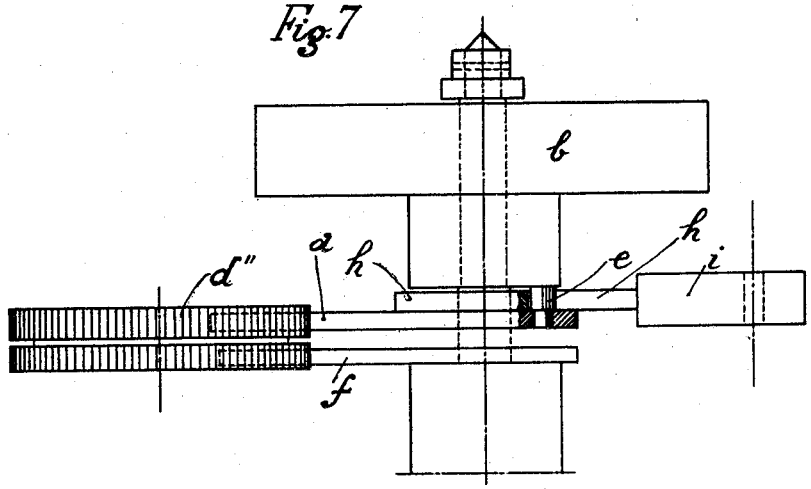

Fig. 7 is a diagram drawn on a larger scale of the whole system.

Figure 8:
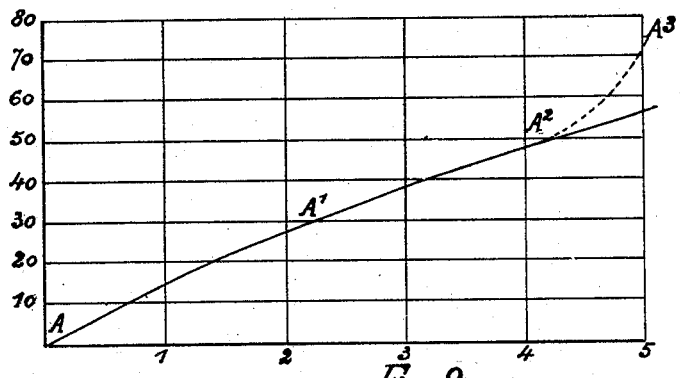
Figure 9:
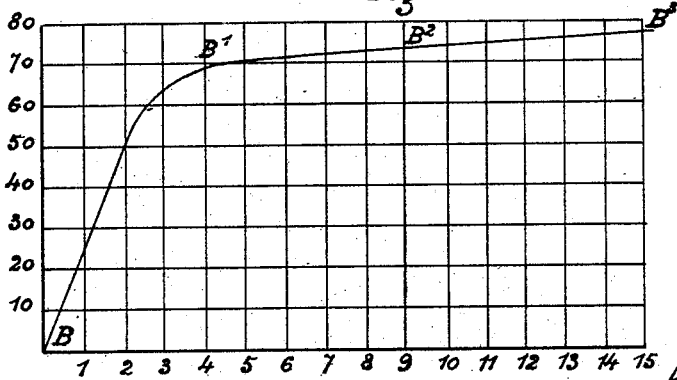

Figs. 8 and 9 show the release curves of the mainspring of the clock and of the actuating spring of the winding mechanism respectively.

Fig. 10 is a view of a form of reinforced mainspring which is preferred.

Fig. 11 is a perspective view of one of the hooks for fastening the spring reinforcing leaf.

Referring to the drawings, let $d$ indicate a barrel which for the purpose of this invention may be understood to house a spring whose power is to be utilized in running the clockwork. The axis $d'$ may be understood as denoting the shaft to which one end of the mainspring is attached and which through suitable gearing controlled by the escapement of the clock (not shown) makes, let us say, one revolution per hour. The opposite end of the mainspring may be fixed to the spring barrel in the usual way. The barrel is provided with ratchet teeth $d''$ which ratchet teeth are utilized by my invention in winding the spring. Preferably the number of such ratchet teeth is less than sixty, so that the barrel makes more than one complete rotation under the action of the winding mechanism in each sixty minutes.

The actuating spring which I utilize for winding the clockwork is shown at $c$ in the drawing. It may be a tension or a compression spring, but is shown as a tension spring, having one end fixed to the base plate of the movement. $a$ is the actuating pawl which engages the ratchet teeth of the barrel and preferably is limited in its movement to advancing the barrel one tooth at each reciprocation. The power actuating the winding pawl $a$ is that stored in the actuating spring $c$, the spring being connected to the pawl in any suitable way. A stop pawl or similar device $f$ is provided for holding the ratchet wheel in its advanced position after each reciprocation of the actuating pawl. This stop pawl which is shown in Fig. 2ª of the drawing may be mounted in any suitable position, but preferably is superimposed upon the actuating pawl $a$ and has its pivotal point coincident with that of the armature shaft to be described. It is held in contact with the ratchet by the spring $g$. A compact construction is thus attained.

The actuating pawl $a$ is moved backwardly to engage a new tooth at each reciprocation by an armature $b$ which is moved by an electro-magnet $u$, the pole pieces being preferably shaped to equalize the magnetic attraction. The armature is shown as oscillating upon an axis $b'$ and when current is passed through the magnet in a manner to be described the armature is moved from its tilted position shown in Figs. 2 and 3 to a position in which it is in line with the pole pieces. The actuating pawl $a$ is pivoted to the armature by a pin $e$, the latter acting as a crank to pull the actuating pawl backwardly at each oscillation of the armature. Preferably the pin $e$ is so located that when the armature is in its attracted position nearly in line with the pole pieces, the pin $e$ with respect to pawl $a$ will closely approach the condition of dead center, whereby in such position a small armature torque will be sufficient to effectively oppose the maximum pull on the pawl actuating spring $c$.

To control the oscillations of the armature, and thereby the movements of the actuating pawl $a$, an automatic switching device is employed which is best seen in Fig. 3. This switching device comprises a tilting finger $h$ pivotally mounted on the armature axis $b'$ and adapted to occupy two positions, in one of which a circuit is completed through the magnet and in the other of which it is broken. Cooperating with this switch finger or wiping contact $h$ is a movable arm $i$ which is connected to one terminal of the battery or other source of electric energy. The arm $i$ is insulated from the frame and pivoted on a pin $j$, a light spring $j'$ being interposed between the said arm and a fixed abutment $j''$ tending to hold the arm in contact with the aforesaid switch finger $h$. It carries an insulating block $l$ against which the tilting finger $h$ rests in one position, that is, the position in which the circuit is broken. When the tilting finger $h$ contacts with the metal of the arm, the circuit is completed. In operation when the actuating pawl is moved back against the tension of the spring $c$, the finger $h$ contacts with the arm $i$. It normally maintains this position until the armature is moved to a position in line with the pole pieces when the finger $h$ is struck by a pin $z$ movable with the armature and is forced back from its position onto the insulated block $l$, thus breaking the circuit. The armature being no longer attracted, is free to oscillate back to its inactive position under the tension of the actuating spring $c$ as it pulls the actuating pawl forwardly, thus advancing the winding ratchet $d$ one tooth. The pin $z$ is preferably fixed upon a small disk adjustable upon the axis of the armature in order to adjust the timing of the cutting out of the current.

When the actuating spring $c$ thus moves the armature back to its retracted or inactive position, it does so with varying degrees of force, depending upon how loosely or how tightly the spring $d$ is wound. If the spring is considerably run down, the actuating spring $c$, having little work to do at that moment in advancing the ratchet one tooth, acts very promptly and throws back the armature rapidly so that its inertia carries it beyond its normal position of rest. This brings into contact with the tilting finger $h$ a projection $p$ formed on a lever $n$ pivoted at $m$ to the armature, the principal function of which will be later described. For the present operation, however, this projection $p$ when the armature is thrown back beyond its normal position of rest contacts with the tilting finger $h$, and moves it from its position in contact with the insulated block $l$ into contact with the conducting portion of the arm $i$, and thus reestablishes the circuit. It results from this construction that when the mainspring is run down, the armature will keep almost continuously in motion, thus producing repeated step by step winding movements of the actuating pawl and spring. I prefer to introduce a spring stop in the path of the armature so as to give the latter a returning movement toward its energized position. This may appropriately be the leaf spring $r$ fixed to the armature which engages a stop pin $s$ fixed to the base plate of the device. The stop also prevents inordinate movements of the armature in the regular operation of the device.

The device as thus described may be utilized without further additions but I prefer to provide in addition a mechanically-controlled means for completing the circuit and thus moving the armature at predetermined intervals so that a periodic operation of the mechanism is insured by the mechanical movement of the clockwork itself instead of relying entirely upon the change in the relative tensions of the clockwork spring and the winding pawl actuating spring $c$. The operation hereinbefore described wherein the position of the wiping contact member $h$ is determined by the force differential existing between the clockwork motor spring and the pawl actuating spring is quite reliable, but like all spring-controlled mechanisms it is not absolutely positive in operation. In the preferred form such positive control is insured periodically by mechanically moving the wiping contact finger $h$ into circuit-making condition position irrespective of the position of the armature. A simple method of effecting this result is by means of a wheel $o$ mounted upon an axis $o'$ and driven by the clockwork. This wheel may be rotated once in every few minutes and is provided with a series of cam-shaped teeth $o^2$ which engage the end of a lever $n$ pivoted at $m$ so as to move the projection $p$ upwardly, thus engaging the circuit-controlling finger $h$ and moving it from the insulation $l$ to the metallic portion of the arm $i$, thus completing the circuit. When this is accomplished, the winding operation commences and continues until it is again stopped by the tightening of the mainspring. By this means at frequent intervals approximating every minute the circuit is completed by a positive mechanical action and at least the initial movement of the winding operation enforced upon the mechanism. It is best to provide a stop, such as $q$, which is engaged by the lever $n$ when it drops off of a tooth of the wheel $o$ ready to be engaged by the succeeding tooth. A light spring $n'$ is best provided to urge the lever into its inactive position against the stop $q$.

In order to avoid any possible jamming of the lever $h$ with the lever $i$ in its contacting position, I prefer to raise this lever at periodic intervals so that the finger $h$ is free to move in accordance with the mechanism described. I have shown a simple way of effecting this result which comprises a pin $v$ on the wheel $o$ which once in each revolution of the wheel engages the end $t$ of the arm $i$, thus moving the lever to the right and breaking the circuit. This may be accomplished frequently if desired by the addition of other pins to the wheel $o$.

In Fig. 3$^a$ I have shown a modification of the invention in which the lever $n$ is omitted. The contacting finger $h$ is in this construction urged by a light spring $h'$ in the direction in which it will maintain contact with the conducting portion of the lever $i$. In Fig. 3$^a$ the contacting finger $h$ is shown as resting upon the insulation $l$, the magnet being deenergized and the winding mechanism at rest. When the pin $v$ on the wheel $o$ contacts with the projection $t$ on the lever $i$, it will lift the lever, thus permitting the spring $h'$ to move the lever to the left and when the pin $v$ passes beyond the lever $i$, the latter is dropped onto the end of the contacting finger and the circuit completed, the contacting finger $h$ engaging the V notch $k$ in the conductive lever $i$. The armature is then oscillated to retract the actuating pawl $a$ and the pin $z$ on the armature forces back the finger $h$ out of notch $k$ to its circuit-breaking position in contact with the insulating block $l$. The actuating spring then pulls the actuating pawl forwardly one tooth as before and also retracts the armature to its inactive position. If the mainspring is not tight, the pin $m'$ on the armature will force the contacting finger $h$ over onto the conducting portion of the lever $i$, thus reestablishing the circuit and causing another oscillation of the armature. This will continue so long as the mainspring is not wound sufficiently tightly to produce a slow movement of the armature back to its inactive position. When this occurs the pin $m'$ will not reach the finger $h$ and the latter will remain seated on the insulating block $l$.

In this construction if it be assumed that the wheel $o$ makes a complete rotation every eight minutes, then the winding mechanism will operate only once in each eight minutes but when it operates it will continue operation until the mainspring is wound tightly, whereupon it will stop and remain at rest for another similar period. Of course, these periods may be easily increased by using two or more projections on the wheel $o$.

In Figs. 4, 5 and 6 I have shown a modified form of the invention in which $u$ is the electro-magnet, $b$ is the armature, $c$ is the actuating spring, $a$ the actuating pawl, $f$ the stop pawl and $g$ the operating spring of the pawl $f$.

The pawl $a$ is pivoted to the armature which retracts it and thereby tensions the spring $c$ in the same manner as in Figs. 1 to 3. The circuit, however, is controlled by a contact lever $h$ which is shown as pivoted on the same axis as the armature and is so related to the latter that the pin $e$, for instance, upon which the pawl $a$ is mounted, actuates the lever $h$ to make and break the circuit. The lever $h$ is provided with a wide slot or U-shaped groove, the two sides of which constitute abutments which are engaged by the pin $e$. The lever $h$ has but a slight movement sufficient to bring it into and out of contact with a switch member, its movements occurring at the extreme positions of the armature. The switch member comprises a pivoted arm $i$ which is mounted upon the frame of the clockwork and carries a terminal plate $k'$ which is arranged in the circuit so that when the lever $h$ is in contact therewith the circuit is completed through the electromagnet.

Preferably this plate is arranged upon an insulating block $k''$. Fig. 5 shows the parts when the pawl has been advanced under the action of the spring $c$ to wind the mainspring one tooth and the armature has been thereby retracted. The pin $e$ on the armature has shortly before contacted with the upper abutment of the lever $h$ and has moved it into contact with the terminal $k'$, thus completing the circuit so that the armature will immediately move back to its energized position shown in Fig. 6, thereby tensioning the spring for the next winding movement. In Fig. 6 the armature has completed its operative stroke and the pin $e$ has moved into contact with the lower abutment, thereby shifting the lever $h$ out of contact with the terminal plate $k'$ over to the body of the lever which, as before stated, is insulated from the plate. The circuit being thus broken the spring again actuates the pawl to advance the winding of the mainspring.

In Fig. 8 I have plotted a curve which shows the increase in tension of an ordinary spiral spring, such as is used for the mainspring of a clock or the like, in proportion to the number of turns. The turns are plotted in abscissa and the tension valued in grams at the periphery of the barrel in ordinates. From the curve it will be seen that the reduction of tension is almost accurately proportional to the number of turns. It will be understood that when a spring of this character becomes tightly wound, there is a sudden and uncertain increase in tension obtained at the instant when the convolutions are pressed closely together around the shaft or core of the barrel. This sudden increase in tension has been omitted from the curve.

In the operation of the devices of Figs. 4 to 6, the winding of the mainspring is quite automatic. That is to say, so long as the mainspring can be advanced one tooth, the armature will retract the pawl and with it the spring $c$ and this retraction will be complete. In the usual construction of mainspring the parts are apt to be wound too tightly so that they become jammed.

I hence prefer to introduce into the mainspring an abrupt but nevertheless moderate resistance to winding which goes into effect before the spring is tightly jammed. This resistance may be plotted by the dotted line $A^2 A^3$. This may be accomplished by inserting toward the outer part of the spring an additional blade or leaf in the spring as indicated in Fig. 10. This auxiliary blade has preferably the effect of doubling the thickness of the spring for about one convolution. It may be constructed either as a separate blade held in place between the convolutions of the mainspring by means of lugs or hooks $L^3$ (Fig. 11) or by bending the spring back on itself for approximately one convolution. Toward the end of the winding movement this additional thickness of spring comes into play and introduces sufficient resistance to winding to stop the operation of the winding mechanism without jamming the spring. It is not absolutely essential that the said auxiliary leaf be formed of resilient material although this is preferable.

In the curve shown in Fig. 9 the attractive strains of a helical spring, such as the actuating spring, during the period of its reaction after being placed under tension are indicated on the axis of the abscissa in one-tenth millimeters and the tensions in grams upon the axis of the ordinates. This curve shows only the necessary portion of reaction. It will be seen from this graph that the curve is almost horizontal, the modifications in tension between $B'$ and $B^2$ being very slight. On the other hand, the fall of tension will be very sudden from $B'$ to $B$, this being due to the convolutions beginning to press against one another at the end of the reaction. Consequently it is advisable that the operation of the actuating spring, so far as its effect on the actuating pawl is concerned, shall be limited to the nearly horizontal portion $B^2$ $B^3$. Thus the actuating spring will be placed originally under an initial tension sufficient to bring it into the horizontal portion of the graph before it is further stretched by the action of the oscillating armature.

To facilitate an understanding of the mode of operation I will start when the mainspring is fully run down, the actuating spring $c$ retracted and the armature in its inactive position and contact is made to complete the circuit. The armature will then oscillate and this oscillation will be rapidly repeated due to the fact that little winding effort is required of the actuating spring. The armature will continue in oscillation and the mainspring is wound tooth by tooth until the resistance of the mainspring increases to the point where the supplemental blade of the mainspring begins to be affected by the tension on the mainspring. Or in other words, where the resistance reaches the curve $A^2 A^3$ (Fig. 8). At this point the armature will not be able to return completely to its inactive position, the energizing contact will not be made and the winding operation will stop.

As the mainspring begins to unwind or run down, due to the operation of the clock, its tension becomes less and when this tension reduces sufficiently to enable the power stored in the actuating spring to complete the winding movement of one tooth, the armature will be moved to its inactive position, thus making the energizing contact, and the armature will then oscillate a few times until the spring is again under sufficient tension to prevent its operation.

It will be seen that the action of the armature and hence of the winding mechanism is automatic, and it will also be seen that once the mainspring is fully wound it is not permitted to run down to any great extent. By this construction there is no violent operation of the actuating pawl, either in its oscillations, its beginning of movement, or in its stopping. It begins its movement long before the spring is fully run down and ends its movement before the spring is tightly wound up or jammed, the latter being assisted by the provision of the supplemental blade in the mainspring or its equivalent.

It will be understood that various modifications may be made in the constructions herein described without departing from the spirit of the invention.

I claim as my invention:—

1. An electro-mechanical device for the putting in tension of a barrel spring, which comprises a winding ratchet, a locking pawl for said ratchet, a pawl operating the forward rotation of the ratchet, an aperture in the middle of said pawl, a stationary axis guiding this aperture and allowing displacements in both directions, a spring controlling the forward displacement of the pawl and electro-mechanical means effecting the putting in tension of the spring and causing the recoil of the pawl before effecting its operative run.

2. An electro-mechanical device for the putting in tension of a barrel spring comprising a winding ratchet and its locking pawl, a pawl controlling the forward movement of the ratchet, a spring controlling the forward movement of said pawl, a connecting crank pin placed between the pawl and the oscillating armature of the magnet, a switching device comprising an insulated element and a conductive element, a contacting arm, means to bring said arm upon the conductive portion of the switching device and means to bring it upon the insulated portion of same when the oscillating movement of the armature ceases.

3. An electro-mechanical device for the putting under tension of a barrel spring which comprises a winding ratchet and its locking pawl, a pawl controlling the forward movement of the ratchet, a spring controlling the forward movement of the pawl, a connecting crank pin between the pawl and an oscillating electro-magnetic armature, a switching device comprising an insulated portion and a conductive portion, a contacting lever upon the axis of the armature and a notch provided upon said lever for the passage of the connecting crank pin between the pawl and the armature and shaped so that this crank pin presses against one edge of the notch in order to produce the closing contact of the circuit when the armature is stationary and presses against the other edge to produce the opening contact upon the insulated part of the switching device when the oscillating movement of the armature which puts the controlling spring under tension ceases.

4. A winding mechanism for an energy storing device, said mechanism comprising a spring means for advancing the part to be wound step by step, means for retracting the spring means after each actuating movement of the latter, and a controlling mechanism operable to secure a succession of operative movements of the spring means until the resistance of the device to be wound overcomes the power of said spring means and auxiliary resistance means adapted to artificially accelerate the winding resistance of said energy storing device after a predetermined winding has taken place.

5. A winding device, comprising a spring means adapted to wind a spring driven mechanism by a succession of movements, an engaging device adapted to operatively engage the said mechanism to be wound and move the same under the power of said spring means, a retracting device electro-magnetically operated to move the engaging device rearwardly, and tension the spring means, circuit interrupting means for automatically controlling the action of said electro-magnetic device whereby the latter oscillates until the resistance of the device to be wound overcomes the tension on said spring means and auxiliary circuit-closing means controlled by said mechanism independently of the tension of its spring whereby the said retracting device will be electrically actuated after a predetermined movement of said mechanism and regardless of the relative stresses existing in the spring of the mechanism to be wound and the said spring means, thus positively insuring the inception of a winding cycle within a predetermined time after the previous winding cycle has ceased due to the establishing of a balance of forces between the said springs.

6. The winding mechanism according to claim 4, further characterized in that the said energy storing device comprises a spiral spring having a plurality of convolutions of flat spring ribbon, the said auxiliary resistance means comprising a leaf of material interposed between adjacent convolutions toward the outer part of the said spiral spring.

7. A winding device comprising a winding ratchet and its locking pawl, an actuating pawl to advance said ratchet, an armature to move said actuating pawl in one direction, a spring to move said pawl and armature in the opposite direction, an electric circuit controlling the magnetic movement of said armature, a movable contact to open and close said circuit, and a lost motion connection between said armature and said contact, said connection permitting the movement of said armature over a predetermined run in either direction without altering the circuit controlling position of said contact, and said connection being adapted at one end of said armature run to shift said contact to break the said circuit and at the opposite end of said armature run to shift said contact to reestablish said circuit.

8. A winding device comprising a winding ratchet and its locking pawl, an actuating pawl controlling the forward movement of the ratchet, a spring controlling the forward movement of said actuating pawl, an armature to control the rearward movement of said actuating pawl, an electric circuit controlling the magnetic movement of said armature, a movable contact to open and close said circuit, and a lost motion connection between said armature and said contact, said connection permitting the free movement of said armature over the major part of its run without changing the position of said contact, the said lost motion connection being adapted to shift the said contact to break the said circuit toward the end of the magnetically induced movement of said armature and thereafter toward the end of the opposite movement of said armature, said connection being adapted to shift said contact to reestablish said circuit.

9. The device according to claim 7, further characterized in that the said armature oscillates about a pivotal axis, the driving part of said lost motion connection rotating with said armature, the driven part of said connection comprising a pivotally mounted arm which carries the said movable contact, there being provided a contact surface with which said contact cooperates to complete the said circuit, the lost motion connection being adapted to wipe the said movable contact across the face of said contact surface when the armature is moved by the said spring whereby to complete the said electrical circuit, and upon the reverse movement of the armature and after a predetermined run thereof, said lost motion connection being adapted to swing said movable contact off the said contact surface.

10. A winding device comprising a winding ratchet and its locking pawl, an actuating pawl to advance said ratchet, an armature to move said actuating pawl in one direction, a spring to move said pawl and armature in the opposite direction, an electric circuit controlling the magnetic movement of said armature, the said armature being pivotally mounted, a rotatable switch arm controlling said circuit, and a lost motion connection between said armature and said switch arm, said connection permitting a free run of the armature and at one end of said run acting to positively swing said switch arm in one direction and at the opposite end of said run to positively swing said arm in the opposite direction whereby the circuit will be alternately established and broken.

11. A winding device for a spring motor, said device comprising a spring-advanced winding pawl, an electromagnet to retract said pawl, a switch controlling the circuit of said electromagnet and including a wiping contact adapted to be moved in one direction by the force differential existing between the motor spring and the said spring for advancing the winding pawl, a member with which said wiping contact cooperates to control the said circuit, and means actuated by the movement of a part of said motor for periodically moving said member out of the path of said wiping contact.

In witness whereof I have hereunto signed my name.

GEORGES MOMBUR.